US010050902B2

(12) United States Patent
Deguchi

(10) Patent No.: US 10,050,902 B2
(45) Date of Patent: Aug. 14, 2018

(54) METHODS AND APPARATUS FOR DE-DUPLICATION AND HOST BASED QOS IN TIERED STORAGE SYSTEM

(71) Applicant: Hitachi, Ltd., Tokyo (JP)

(72) Inventor: Akira Deguchi, Santa Clara, CA (US)

(73) Assignee: HITACHI, LTD., Tokyo (JP)

(*) Notice: Subject to any disclaimer, the term of this patent is extended or adjusted under 35 U.S.C. 154(b) by 348 days.

(21) Appl. No.: 14/774,097

(22) PCT Filed: Oct. 28, 2013

(86) PCT No.: PCT/US2013/067139
§ 371 (c)(1),
(2) Date: Sep. 9, 2015

(87) PCT Pub. No.: WO2015/065322
PCT Pub. Date: May 7, 2015

(65) Prior Publication Data
US 2016/0021020 A1    Jan. 21, 2016

(51) Int. Cl.
*H04L 12/911* (2013.01)
*G06F 3/06* (2006.01)
*H04L 12/927* (2013.01)

(52) U.S. Cl.
CPC .............. *H04L 47/78* (2013.01); *G06F 3/061* (2013.01); *G06F 3/067* (2013.01); *G06F 3/0608* (2013.01); *G06F 3/0631* (2013.01); *G06F 3/0641* (2013.01); *G06F 3/0665* (2013.01); *G06F 3/0685* (2013.01); *H04L 47/805* (2013.01)

(58) Field of Classification Search
CPC .... G06F 3/067; G06F 3/0631; G06F 9/45558; H04L 41/0813

USPC ........ 711/E12.001, 0.002, 100–111; 709/226
See application file for complete search history.

(56) References Cited

U.S. PATENT DOCUMENTS

| 2005/0216591 | A1* | 9/2005 | Sato | G06F 3/0605 |
| | | | | 709/226 |
| 2007/0033358 | A1* | 2/2007 | Sekine | G06F 3/0619 |
| | | | | 711/163 |
| 2008/0195826 | A1* | 8/2008 | Yamazaki | G06F 3/0608 |
| | | | | 711/161 |

(Continued)

FOREIGN PATENT DOCUMENTS

| JP | 2008-197779 | 8/2008 |
| WO | WO 2014002162 A1 * | 1/2014 ............ G06F 3/061 |

OTHER PUBLICATIONS

Access restriction server virtual storage—Google Patent Search—Aug. 30, 2017.*

(Continued)

*Primary Examiner* — Thomas J Dailey
*Assistant Examiner* — Ruth S. Solomon
(74) *Attorney, Agent, or Firm* — Procopio, Cory, Hargreaves & Savitch LLP

(57) ABSTRACT

Example implementations described herein are directed to addressing potential decreases in performance for a storage system coupled to a server. In a first example implementation, systems and methods are directed to addressing potential performance issues for storage tiering and the storage I/O control. In a second example implementation, systems and methods are directed to addressing potential performance issues for storage tiering and de-duplication.

10 Claims, 17 Drawing Sheets

(56) References Cited

U.S. PATENT DOCUMENTS

| | | |
|---|---|---|
| 2010/0031058 A1 | 2/2010 | Kito et al. |
| 2011/0185120 A1 | 7/2011 | Jess |
| 2011/0231769 A1 | 9/2011 | Tovar |
| 2012/0005435 A1* | 1/2012 | Emaru ................ G06F 3/0608 711/154 |
| 2012/0005447 A1* | 1/2012 | Yamamoto ........... G06F 3/0605 711/170 |
| 2013/0232261 A1* | 9/2013 | Wright .................. H04L 41/50 709/224 |
| 2013/0326064 A1* | 12/2013 | Gulati .................. G06F 9/5061 709/226 |
| 2015/0106565 A1* | 4/2015 | Ayukawa ............... G06F 3/061 711/114 |

OTHER PUBLICATIONS

Access restriction virtual storage—Google Patent Search—Aug. 30, 2017.*
English Machine Translation of WO2014002162A1—Sep. 15, 2017.*
International Search Report dated May 7, 2014, issued for International Application No. PCT/US2013/067139.
Office Action for JP App No. 2015-561328 dated Oct. 4, 2016, 8 pgs.

* cited by examiner

| Virtual Machine ID | Set value | Control flag | Volume ID | Address |
|---|---|---|---|---|
| 1 | 400 | OFF | 1 | 0-1024000 |
| 2 | 600 | ON | 2 | 512000-204800 |
| 3 | 200 | OFF | 3 | 0-1024512 |
| ... | ... | ... | ... | |

| Volume ID | Tier flag | Address | Pool ID | Page ID | IOPS | Pin |
|---|---|---|---|---|---|---|
| 1 | ON | 0-511 | 1 | 1 | 300 | OFF |
| | | 512-1023 | — | — | — | — |
| | | 1024-1535 | 1 | 3 | 300 | SSD |
| 2 | ON | 0-511 | 1 | 4 | 200 | SATA |
| ... | ... | ... | ... | ... | ... | ... |
| 3 | OFF | 0-511 | 2 | 1 | 250 | OFF |
| ... | ... | ... | ... | ... | ... | ... |

FIG. 9

| Pool ID | Page ID | Free flag |
|---------|---------|-----------|
| 1 | 1 | NO |
| 1 | 2 | NO |
| 1 | 3 | NO |
| 1 | 4 | ON |
| ... | ... | ... |

FIG. 10

| Medium Type | De-Duplication Target |
|---|---|
| SSD | SSD, SAS |
| SAS | SSD, SAS, SATA |
| SATA | SSD, SAS, SATA, External |
| External | SSD, SAS, SATA, External |

FIG. 15

METHODS AND APPARATUS FOR DE-DUPLICATION AND HOST BASED QOS IN TIERED STORAGE SYSTEM

BACKGROUND

Field

The example implementations are related to computer systems and storage systems, and more particularly, to functionalities such as de-duplication, Quality of Service (QoS), and storage media tiering.

Related Art

In the related art, there are methods and apparatuses to perform automated page-based tier management of storing data in tired storage using pool groups. Such related art systems can include tiered storage systems. Within the tiered storage systems, the related art may also utilize de-duplication techniques for block level data de-duplication. The storage system may also include storage input/output (I/O) control functionality which controls the number of I/O into the storage system based on the storage performance. The storage system may also automate storage tiering functionality within the storage system.

Different types of storage mediums can be installed in the storage system. For example, the storage system can have solid state drives (SSD), high performance hard disk drives (HDD), as well as high capacity and low performance HDD. For example, high performance HDD can include Serial Attached SCSI (SAS) HDD and high capacity and low performance HDD can include Serial ATA (SATA) HDD.

The storage tiering functionality of the storage system may automatically move the data to an optimal storage media based on workload to improve the cost performance. The "hot" data which is accessed frequently is stored in high performance storage media such as a SSD. The "cold" data having a low access frequency is stored in SATA.

The storage system can provide functionality such as remote copy, compression, de-duplication. The de-duplication functionality detects multiple occurrences of the same data and replaces an occurrence of the data with pointer to reduce the amount of data stored.

The storage system may also include storage I/O control functionality, which is a quality of service (QoS) functionality executed in the server. This functionality monitors the response time of the I/O (input and output) command. If the response time has increased (i.e., performance has decreased), the functionality assumes the HDD performance bottleneck has occurred and decreases the number of the I/O to avoid degradation of the response time.

The storage tiering functionality in the storage system may not work with other functionalities. For example, if both of the functionalities are applied to the same data, the effect of the functionalities may not be obtained.

SUMMARY

Aspects of the present disclosure may include a system coupled to a server which may include a storage system and a management server. The storage system may include a plurality of storage devices including a first storage device and a second storage device having a higher performance than the first storage device; and a controller configured to manage a virtual volume having a plurality of virtual storage areas to which a first storage area in the first storage device or a second storage area in the second storage device is allocated according to access frequency information to each of the plurality of virtual storage areas. The management server may include a processor configured to receive a notification regarding access restriction executed on the server; and direct cancellation of the access restriction executed on the server if the server is configured to use the virtual volume.

Aspects of the present disclosure further include a method for a system coupled to a server. The method may include, for a storage system having a plurality of storage devices including a first storage device and a second storage device having a higher performance than the first storage device, managing a virtual volume having a plurality of virtual storage areas to which a first storage area in the first storage device or a second storage area in the second storage device is allocated according to access frequency information to each of the plurality of virtual storage areas; and receiving, at a management server, a notification regarding access restriction executed on the server; and direct cancellation of the access restriction executed on the server if the server is configured to use the virtual volume.

Aspects of the present disclosure further include a computer program for a system coupled to a server. The computer program containing instructions that involve, for a storage system having a plurality of storage devices including a first storage device and a second storage device having a higher performance than the first storage device, code for managing a virtual volume having a plurality of virtual storage areas to which a first storage area in the first storage device or a second storage area in the second storage device is allocated according to access frequency information to each of the plurality of virtual storage areas; and code for receiving, at a management server, a notification regarding access restriction executed on the server; and direct cancellation of the access restriction executed on the server if the server is configured to use the virtual volume. The code may be in the form of executable instructions that are stored in a computer readable storage medium or a computer readable signal medium as described below.

BRIEF DESCRIPTION OF THE DRAWINGS

FIG. 9 is an example of the volume table in the storage control information, in accordance with a first example implementation.

FIG. 10 is an example of the page table in the storage control information, in accordance with a first example implementation.

FIG. 15 is an example of the de-duplication domain table, in accordance with a second example implementation.

DETAILED DESCRIPTION

Figure 1:
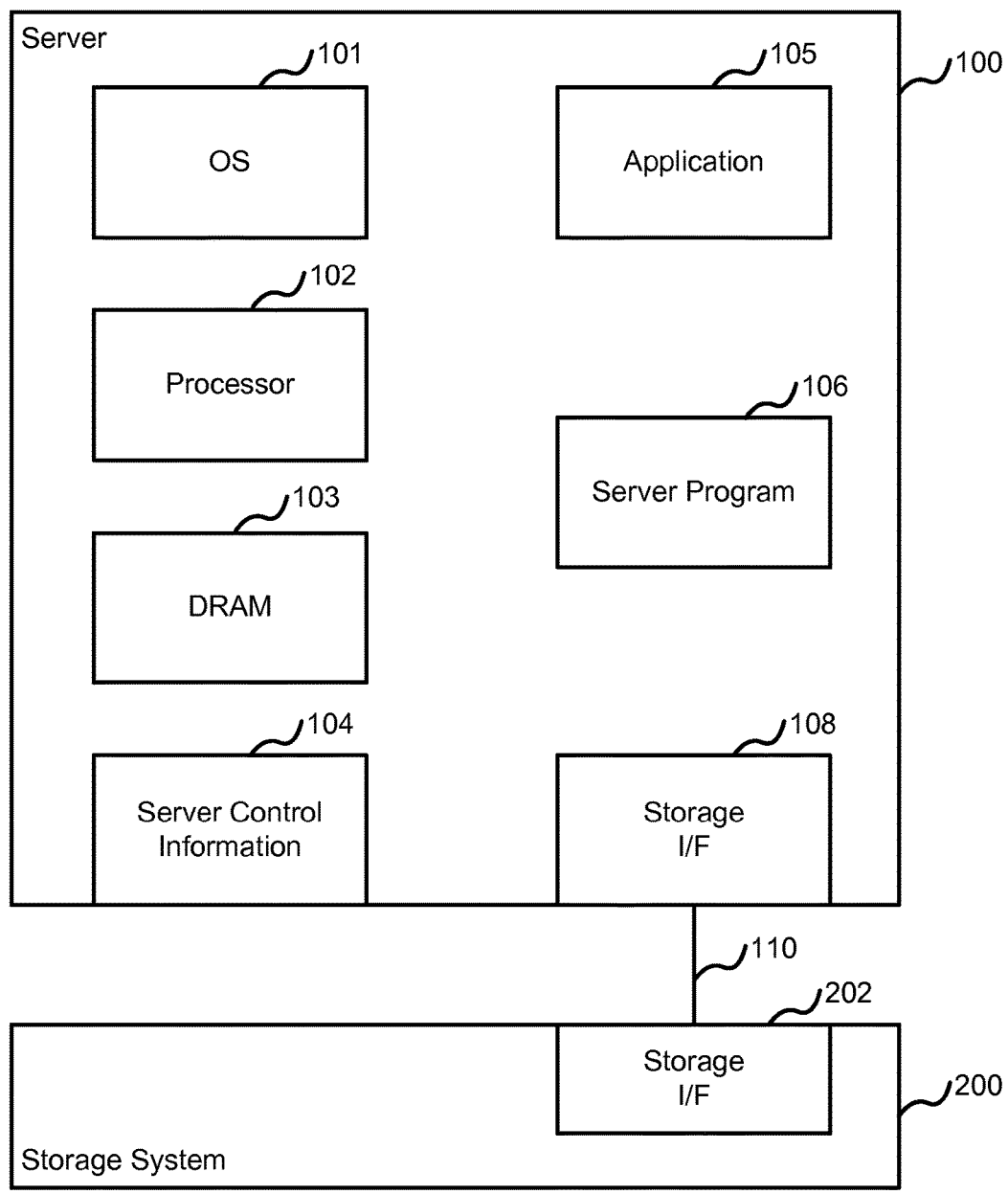
FIG. 1 illustrates a diagram of a computer system from the perspective of the server in accordance with the first example implementation.

The following detailed description provides further details of the figures and exemplary implementations of the present application. Reference numerals and descriptions of redundant elements between figures are omitted for clarity. Terms used throughout the description are provided as examples and are not intended to be limiting. For example, use of the term "automatic" may involve fully automatic or semi-automatic implementations involving user or administrator control over certain aspects of the implementation, depending on the desired implementation of one of ordinary skill in the art practicing implementations of the present application.

A problem may occur when the storage tiering and the storage I/O control are applied to the same data. The storage tiering moves the cold data to the SATA. When the number of the I/O to the data stored in the SATA increases, the SATA may become a bottleneck. Thus, the storage I/O control will decrease the number of the I/O issued by the server. However, the storage system may not recognize that the server controls the number of the I/O to the storage system. So, the storage system may fail to recognize that the number of I/O is high in reality, and determines that there are few I/O to the data and therefore does not move the data to the SAS or SSD, but rather leaves the data in the SATA. The details of this problem are further described in FIG. 4.

Another problem may occur when the storage tiering and the de-duplication are applied to the same data. In the configuration, the de-duplication may de-duplicate the data stored in the SSD and SATA. If the data on the SATA is kept and the data on the SSD is deleted at the time of de-duplication processing, the access destination of the workload, which was previously accessing the higher performance SSD, will suddenly be changed to the lower performance SATA. The server may thereby detect an unexpected performance decrease.

Moreover, the storage tiering may employ a pinning option which pins the data in the specific storage media so that the data does not move. For example, the data may be pinned in the SATA to avoid blockage of other accesses. Other use cases can include when the number of the I/O is high, but the priority of the I/O is low. In such a situation, the performance of the SATA is sufficient and can remain pinned because the workload is a sequential access (e.g. such as a log write).

If the data is de-duplicated with the data stored in the SSD and the data in the SSD is kept, the access to the SSD may be blocked by the access to the data which was stored in the SATA. The details of this problem are described in FIG. 13.

Some example implementations will be described with reference to drawings. Any example implementations that will be described in the following do not restrict the application in accordance with the claims, and all of elements and all of pairs of the elements that will be described in the example implementation are not necessarily essential for the means for solving the problems of the invention.

In the following descriptions, the processing will be described while a "program" is handled as a subject in some cases. In the case in which the program is executed by a processor, the predetermined processing is executed. Consequently, a subject of a processing can also be a processor. The processing that is disclosed while a program is handled as a subject can also be a processing that is executed by a processor that executes the program or an apparatus that is provided with the processor (for instance, a control device, a controller, and a storage system). Moreover, a part or a whole of a processing that is executed when the processor executes a program can also be executed by a hardware circuit as substitute for or in addition to a processor.

First Example Implementation

In a first example implementation, the methods to address possible problems arising from the storage tiering and the storage I/O control are described below.

FIG. 1 illustrates a diagram of a computer system from the perspective of the server in accordance with the first example implementation. The computer system may include server 100 and storage system 200. The server may include operating system (OS) 101, processor 102, dynamic random access memory (DRAM) 103, server control information 104, application 105, server program 106, and storage interface (I/F) 108. The server 100 provides service by executing an OS and application like a database system. The storage system 200 has storage I/F 202. The data processed by the database system is stored in the storage system 200. The server 100 is coupled to the storage system 200 via a network 110. OS 101, Server Program 106 and application 105 may be stored into a memory and loaded into DRAM 103. The DRAM 103 and processor 102 may function together as a server controller for facilitating control of the functions of the server 100. Memory may take the form of a computer readable storage medium or can be replaced by a computer readable signal medium as described below.

Computer programs executed in the example implementations may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of non-transitory media suitable for storing electronic information. A computer readable signal medium may include mediums such as carrier waves.

Figure 2:
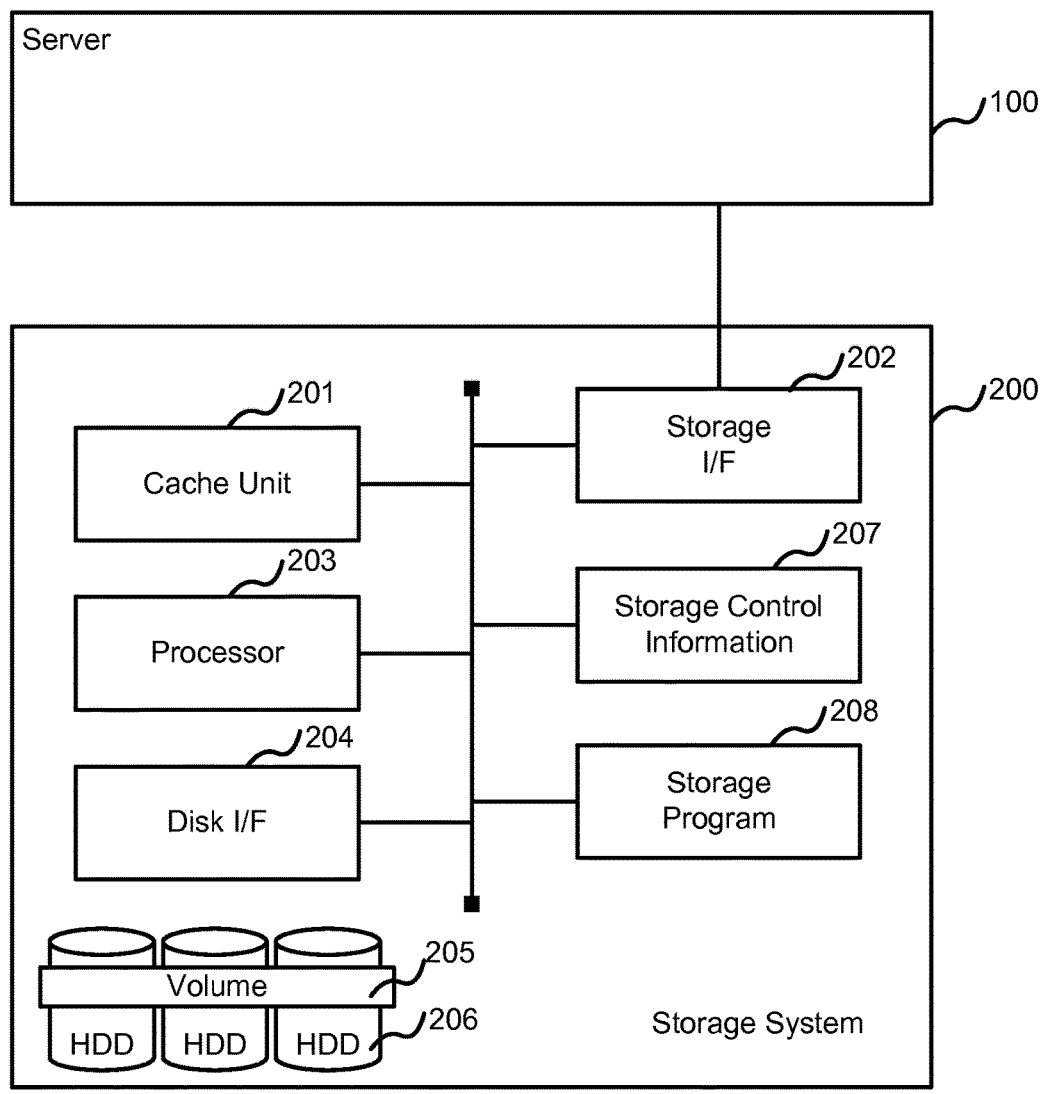
FIG. 2 is a diagram showing a computer system from the perspective of the storage system in accordance with the first example implementation.

FIG. 2 is a diagram showing a computer system from the perspective of the storage system in accordance with the first example implementation. The storage system 200 has cache unit 201, storage I/F 202, processor 203, disk I/F 204, volume 205, HDD 206, storage control information 207, and storage program 208. Storage I/F 202 is coupled to the server 100 via a network 110, and mediates a communication with the server 100. Processor 203 executes a wide variety of processing by executing a wide variety of programs that have been stored into storage program 208. Moreover, the processor 203 executes a wide variety of processing by using a wide variety of information that has been stored into storage control information 207. Disk I/F 204 is coupled to at least one HDD 206 as an example of a physical storage device via a bus. In an example implementation, a volume 205 that is configured to manage data can be configured by at least one storage region of the HDD 206. The physical storage device is not restricted to an HDD 206 and can also be, for example, an SSD (Solid State Drive) or a digital versatile disk (DVD). Moreover, at least one HDD 206 can be collected up in a unit of a parity group, and a high reliability technique such as a RAID (Redundant Arrays of Independent Disks) can also be used. Storage control information 207 stores a wide variety of information used by a wide variety of programs. Storage program 208 stores a wide variety of programs, such as read processing program or write processing program and so on. Cache unit 201 cache the data stored in HDD 206 for performance boost.

Storage control information 207 and Storage program 208 may be stored into a memory for execution by processor 203. The processor 102 and memory may function together as a storage system controller for facilitating control of the functions of the storage system 200. Memory may take the form of a computer readable storage medium or can be replaced by a computer readable signal medium as described above.

Figure 3:
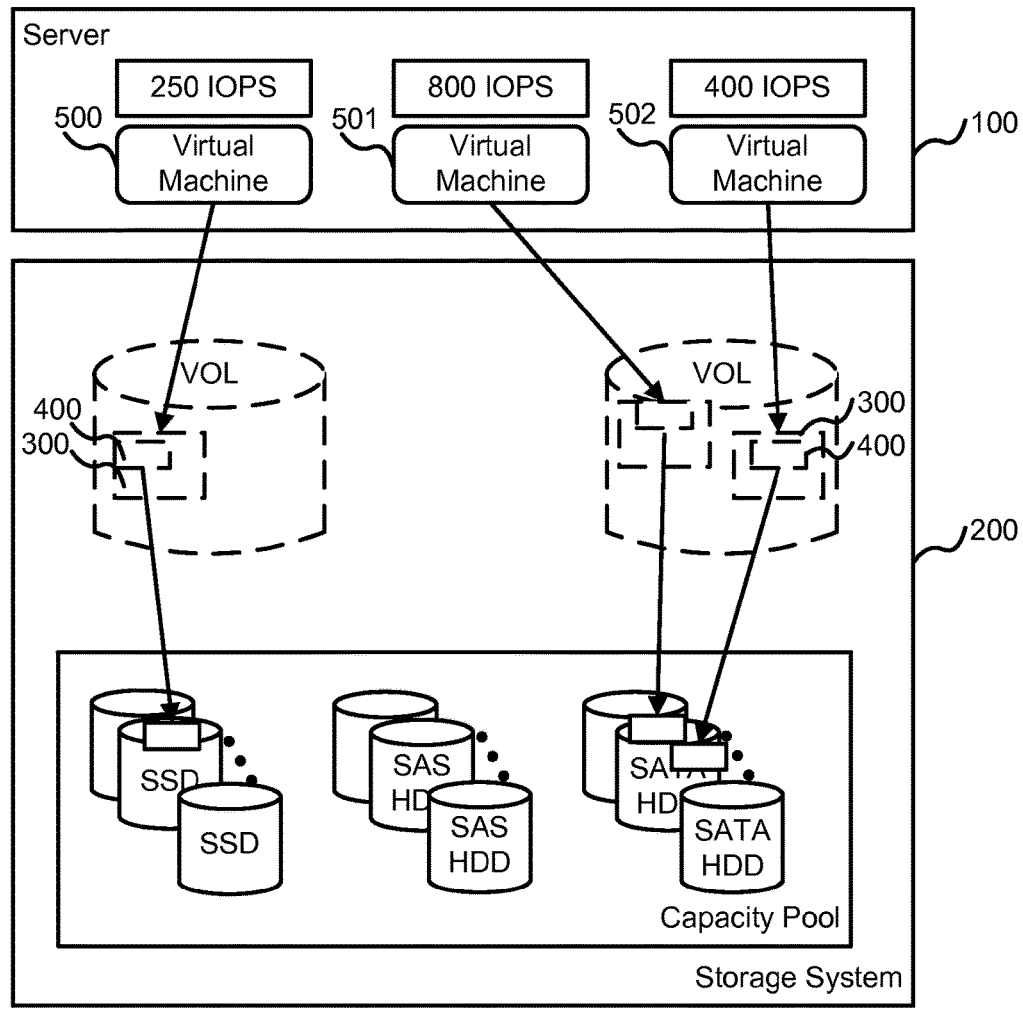
FIG. 3 is an example diagram illustrating the storage tiering functionality executed in the storage system and the storage I/O control functionality executed in the server.

FIG. 3 is an example diagram illustrating the storage tiering functionality executed in the storage system 200 and the storage I/O control functionality executed in the server 100. These functionalities can be executed by techniques known in the art. Server 100 has virtual machines 500, 501, and 502 with differing access rate configurations, indicated in input/output per second (IOPS).

First, the storage tiering functionality is described. In the storage system 200, physical storage devices such as SSD, SAS, SATA form the capacity pool. The VOL (volume) includes a fine-grained segment called page 400. The only area storing the data is corresponding to the physical area. When the data is written from the server 100, the physical area is allocated. The storage system monitors the number of the I/O to each page and moves the data based on the monitored data.

The virtual machine is created in the server 100. And, the storage area 300 stores the virtual machine image. One volume can store a plurality of virtual machine images as illustrated in FIG. 3. The data used by the virtual machine can be stored, as well as the virtual machine image.

The storage I/O control function sets the maximum access rate in IOPS (IO per second). In this example, the set value of the virtual machine 500 is 250 IOPS, virtual machine 501 is 800 IOPS and virtual machine 502 is 400.

Figure 4:
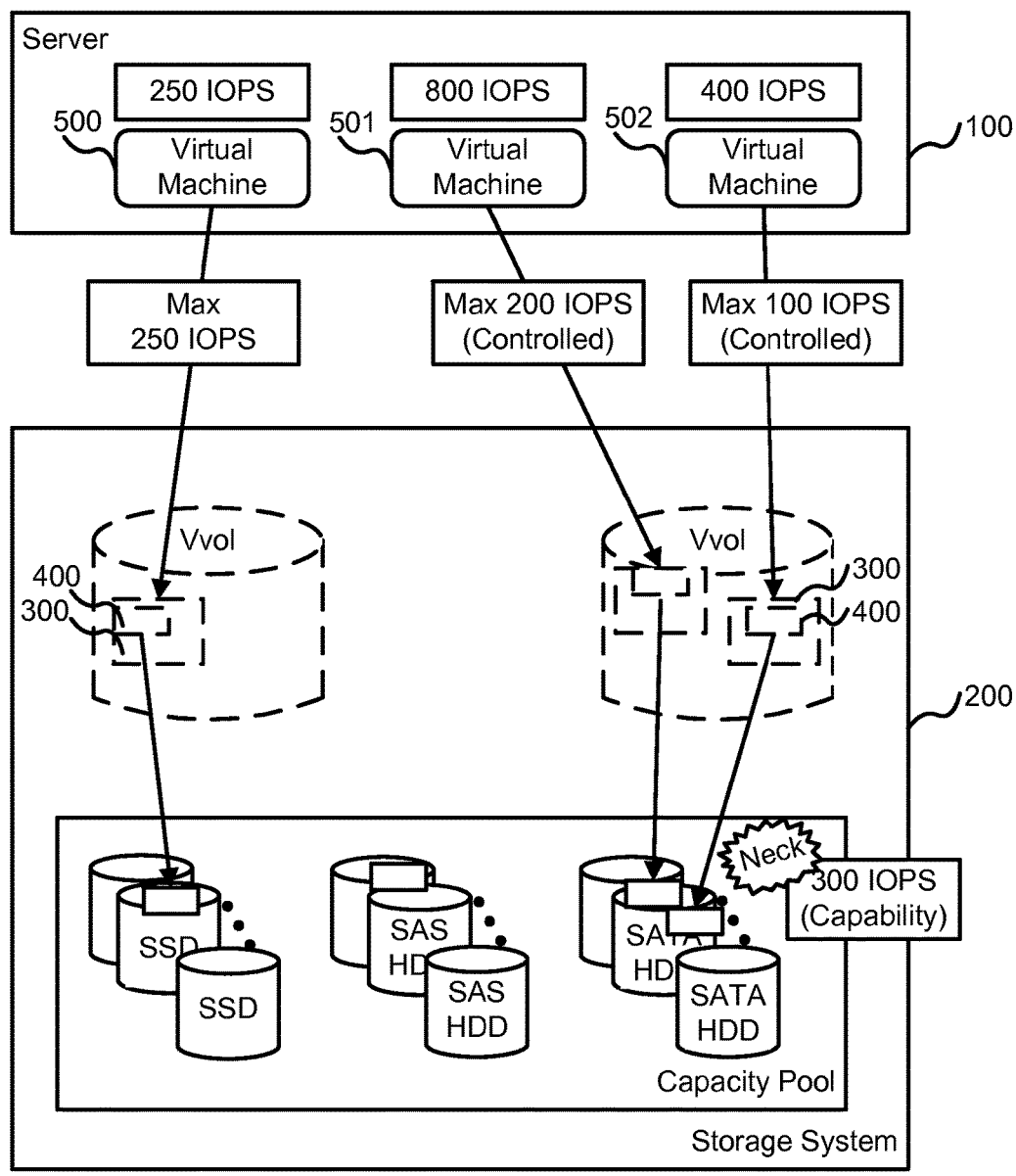
FIG. 4 is a diagram illustrating an example of the problem caused by the storage tiering and the storage I/O control.

FIG. 4 is a diagram illustrating an example of the problem caused by the storage tiering and the storage I/O control. In the example of FIG. 4, the performance of the storage area corresponding to the virtual machine 501 and 502 is 300 IOPS. If the storage area is the bottleneck, then the storage I/O control controls the IOPS issued by the virtual machine 501 and 502 according to the ratio of a set value. In this example, the set value of the virtual machine 501 is 800 IOPS and set value of the virtual machine 502 is 400 IOPS and the performance of the storage area is 300 IOPS. Thus, the IOPS of the virtual machine 501 is restricted to 200 IOPS and the IOPS of the virtual machine 502 is restricted to 100 IOPS.

The maximum IOPS which the storage system receives from the virtual machine 501 is 200, whereas the maximum IOPS which the storage system receives from the virtual machine 500 is 250. Even when priority is given to the virtual machine 501 over the virtual machine 500, the IOPS of virtual machine 500 will be larger than the IOPS of the virtual machine 501. Therefore, the page corresponding to the virtual machine 501 does not get moved to the SSD. Once data is stored in the low performance HDD, the data does not get moved to the SSD or high performance HDD.

The server 100 does not recognize that the storage system 200 is controlling the storage tier based on the IOPS received from the server 100. Further, the storage system 200 does not recognize that the server 100 is controlling the IOPS.

Figure 5:
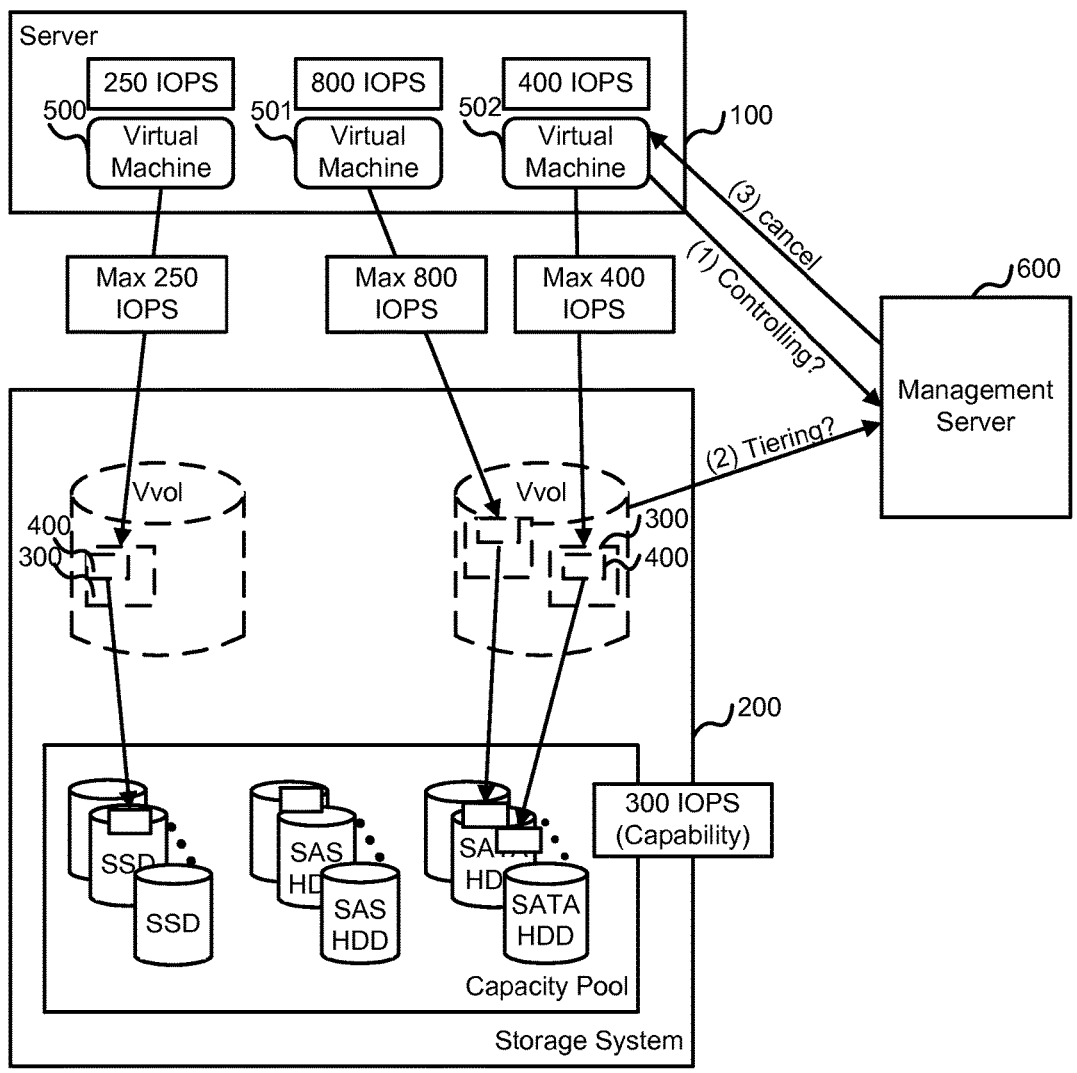
FIG. 5 illustrates a diagram illustrating a first example implementation.

FIG. 5 illustrates a diagram illustrating a first example implementation.

In a first example implementation, a management server 600 is utilized to facilitate recognition of the functionality status.

Processes executed in the management server 600 can also be executed in the server 100 or the storage system 200. Any apparatus that can obtain the information about the server 100 and storage system 200 can execute the processes. In this example implementation, these processes are performed by the management server 600.

The management server 600 connected to the server 100 and storage physically. First, the management server 600 asks whether each virtual machine is controlling the number of I/O. Then, the management server 600 asks whether the volume storing the virtual machine data is tiered volume. Finally, the management server 600 directs stop of IOPS control if needed.

By this stop, the virtual machine 501 can, for example, issue the 800 IOPS at the maximum. This configuration allows for having the maximum IOPS of the virtual machine 501 to be larger than the maximum IOPS of the virtual machine 500. Thus, the data of the virtual machine 500 and 501 may be replaced, and the data of the virtual machine 501 may be stored in the SSD.

In the example mentioned above, the only restriction of the IOPS is stopped. Therefore, the maximum IOPS 800 and 400 of the virtual machines 501 and 502 are stopped. The storage I/O control function can be stopped. In the case, the maximum IOPS 800 and 400 are also deleted. The storage I/O control may need to be reconfigured again after this situation.

The management of the reconfiguration and the first example implementation is described below with respect to FIGS. 6-10. FIGS. 6-10 are diagrams that illustrate programs and control information in the server 100, the storage system 200 and management server 600.

Figures 6, 7:
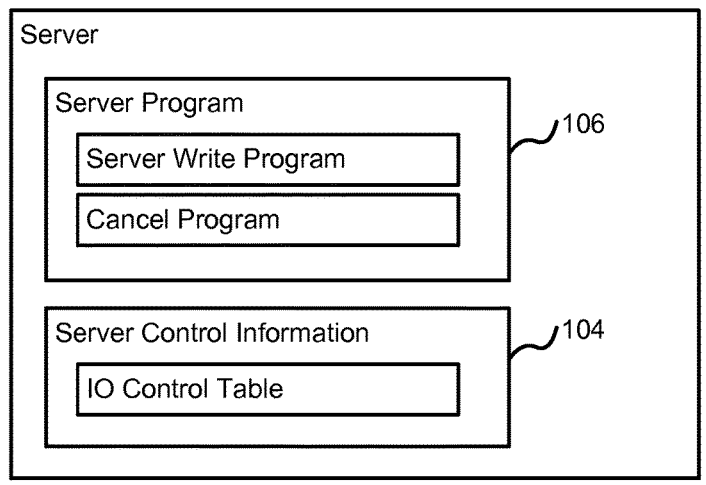
FIG. 6 is a diagram showing the server program and the server control information 104 in accordance with a first example implementation.
FIG. 7 illustrates an example of the I/O control table in the server control information, in accordance with a first example implementation.

FIG. 6 is a diagram showing the server program 106 and the server control information 104 in accordance with a first example implementation. The server program 106 contains a server write program and a cancel program which are described in further detail below. The server control information 104 contains an I/O control table. This table is used by the storage I/O control functionality. Details of this table are described in FIG. 7.

FIG. 7 illustrates an example of the I/O control table in the server control information, in accordance with a first example implementation. This table includes information such as a virtual machine ID, set value, control flag, volume ID and address. The virtual machine ID is an identification to identify the virtual machine uniquely. The set value is a maximum IOPS which is issued by the virtual machine identified the virtual machine ID. The control flag manages whether the virtual machine is controlling the number of IOPS. "OFF" indicates that the virtual machine is not controlling the number of IOPS and "ON" indicates that the virtual machine is controlling the number of IOPS. The volume is an identification of the volume which stores the virtual machine image identified the virtual machine ID. The address is an address in the volume which stores the virtual machine image.

Figure 8:
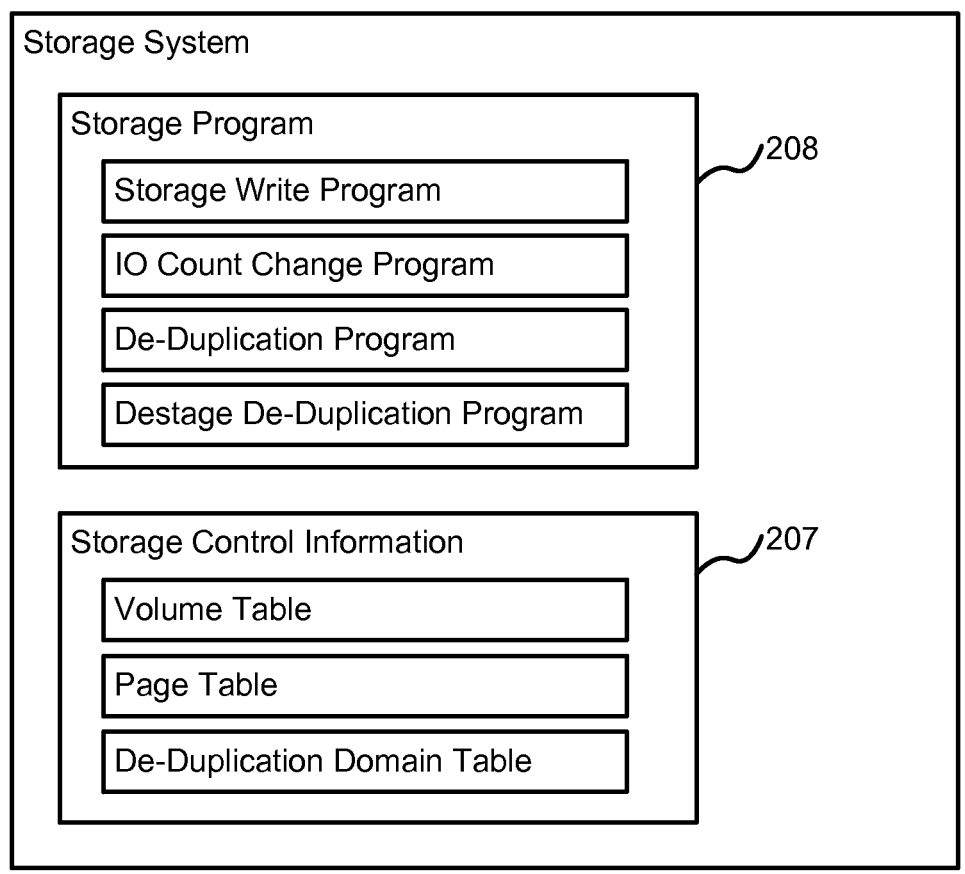
FIG. 8 is a diagram illustrating the storage program and the storage control information in accordance with a first example implementation.

FIG. 8 is a diagram illustrating the storage program 208 and the storage control information 207 in accordance with a first example implementation. The storage program 208 contains a storage write program, I/O count change program, de-duplication program and destage de-duplication program. These programs are described in further detail below. The storage control information contains information which may include a volume table, page table and de-duplication domain table.

FIG. 9 is an example of the volume table in the storage control information, in accordance with a first example implementation. This table may include information such as a volume ID, tier flag, address, pool ID, page ID, IOPS and pin. The volume ID is an identification to identify the volume uniquely. The tier flag manages whether the storage tiering functionality is applied to the volume identified the volume ID. "ON" indicates that the functionality is applied and "OFF" indicates that the functionality is not applied. The address, the pool ID and page ID may assist in managing the relationship between the address in the volume and pool and page information. "-" in the pool id and page id indicates that the physical area is not allocated to the storage area specified the volume ID and address. IOPS indicates the number of the I/O received from the server. The storage tiering functionality can determine a more optimal storage medium for each data based on the IOPS. The pin manages the storage medium in which the page is fixed. "OFF" indicates that the pin option is not used for the page. "SATA" indicates that the data is fixed in the SATA. SSD, SAS and so on are stored in the value of the pin.

FIG. 10 is an example of the page table in the storage control information, in accordance with a first example implementation. This table may include information such as a pool ID, page ID and free flag. The pool ID is an identification to identify the capacity pool. The page ID is an identification to identify the page in the pool. The free flag indicates whether the page is free or not. "Yes" indicates that the area specified by the pool ID and page ID is free and "No" indicates that the area specified the pool ID and page ID is not free.

Figure 11:
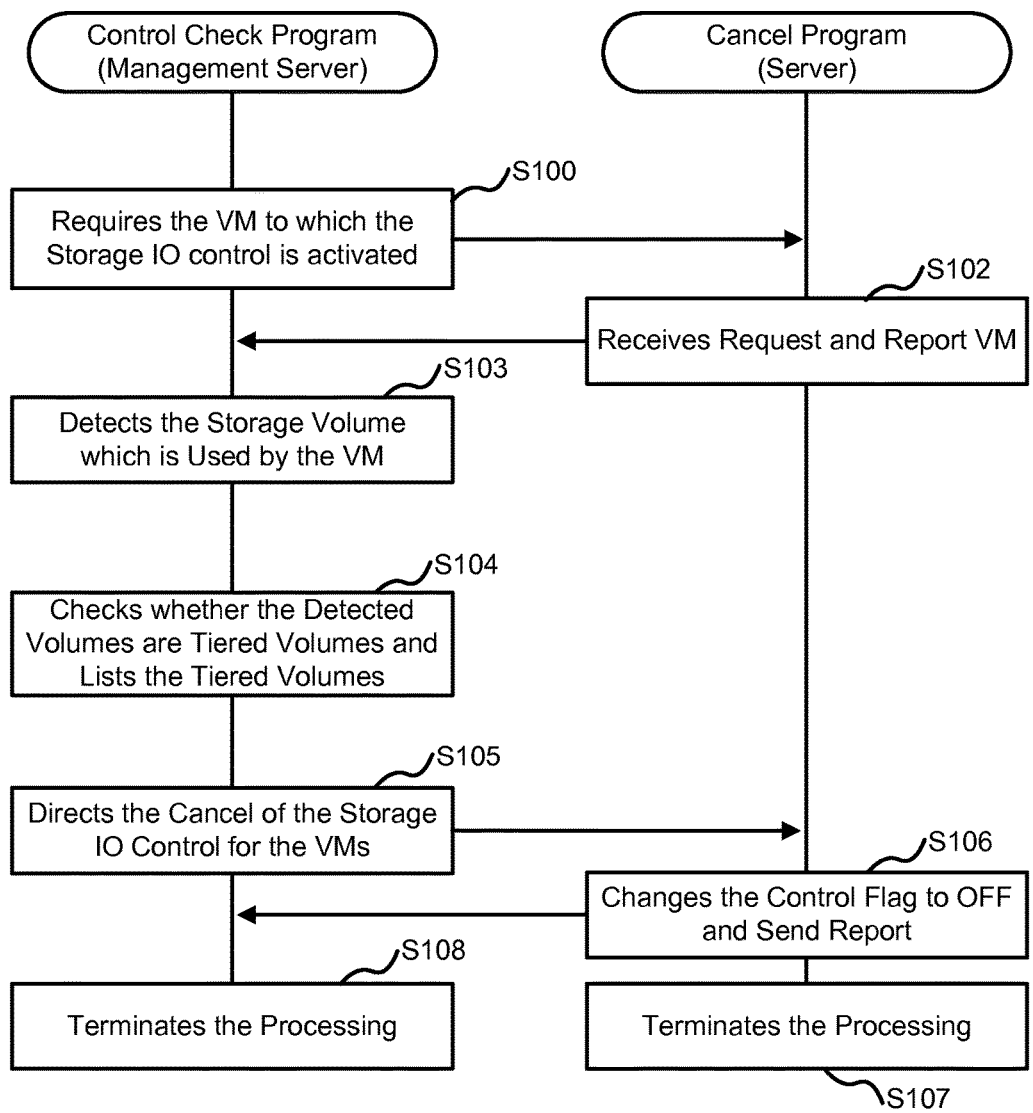
FIG. 11 illustrates an example flow diagram of the control check program and cancel program, in accordance with a first example implementation.

FIG. 11 illustrates an example flow diagram of the control check program and cancel program, in accordance with a first example implementation. The control check program is executed in the management server and the cancel program is executed in the server. First, the control check program determines the virtual machines to which the storage I/O control is activated by sending a request to the server (S100). The cancel program which receives the request from the control check program reports the VM information to the management server (S102). This processing is achieved by accessing the I/O control table. The control check program detects the storage volumes corresponding to the virtual machines which are reported in S102 (S103). Then, the program checks whether the detected volumes are tiered volumes and lists the tiered volumes (S104). This can be implemented by sending a request to the storage system that is managing the volume table.

The control check program directs the cancellation of the storage I/O control for the VMs (S105). The cancel program which receives the cancellation instruction changes the control flag to OFF in the I/O control table and reports the change to the management server (S106). Then the cancel program terminates the processing (S107). Finally, the control check program terminates the processing (S108).

The flow at S105 and S106 can be executed only when there are one or more virtual machines whose IOPS are not controlled and also have the set value smaller than the set value of detected virtual machine. In this example, the IOPS of the virtual machine 500 is not controlled and the set value of the virtual machine 500 is smaller than the set value of the virtual machine 501. Thus, the cancel program changes the control flag of the virtual machine 501 to OFF.

The storage I/O control may change the flag to ON again before the data is moved to the SSD or high performance HDD even if the control flag is changed to OFF. Therefore, methods which keep the OFF status for a predetermined period of time can also be implemented.

Methods for changing the flags corresponding to a part of VMs can also be implemented. For example, only the flag of VM having maximum set value is changed. By doing so, the possibility of data movement of high priority VM can become higher.

For the methods mentioned above, the IOPS control for VM is cancelled. The method that starts the IOPS control for the VM whose IOPS is not controlled can also be implemented. For example, by controlling the IOPS of the VM 500, the data of VM 501 may be moved to the SSD or high performance HDD. The low priority VM having the set value smaller than the set value of the VM 501 will be candidate. The number of the IO issued by the VM 500 can be controlled according to the ratio of a set value and controlled IOPS of VM 501. In this example, the set value of the VM 501 is 800 IOPS and controlled IOPS is 200 IOPS. The set value of the VM 500 is 250 IOPS. Thus, the IOPS of the VM 500 can be restricted to 62.5 IOPS.

Figure 12A:
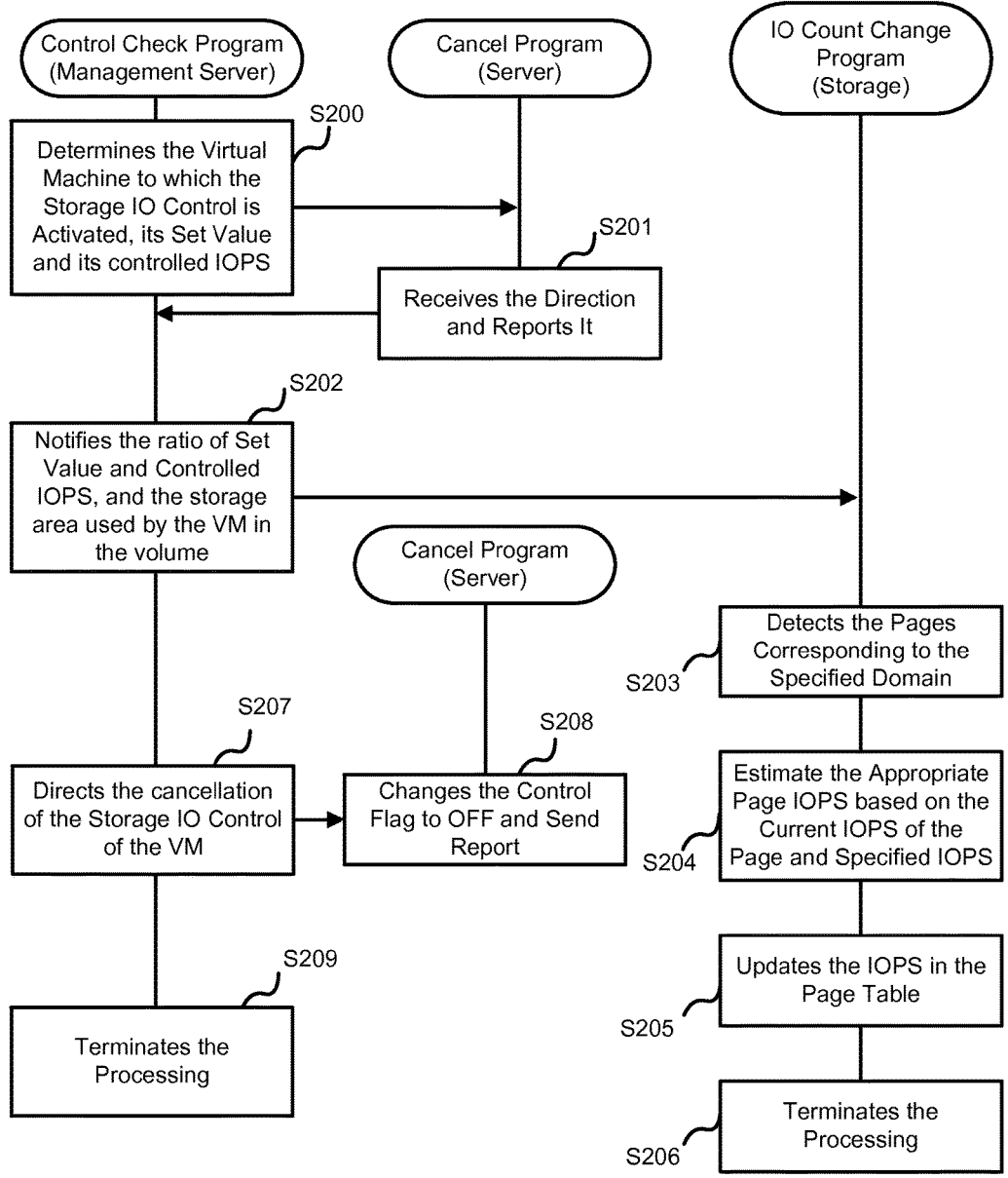
FIG. 12(a) illustrates another method in accordance with the first example implementation.

FIG. 12(a) illustrates another method in accordance with the first example implementation. Specifically, FIG. 12 illustrates another example of the control check program and cancel program, and an example of the I/O count change program. The control check program is executed in the management server, the cancel program is executed in the server and the I/O count change program is executed in the storage system.

In this example implementation, the method estimates the IOPS when there is no restriction of IOPS and moves the data based on the estimated IOPS. So, the IOPS of the virtual machine 501 may be larger than the IOPS of the virtual machine 500.

First, the control check program determines the virtual machine to which the storage I/O control is activated and its set value by sending a request to the server (S200). The cancel program which receives the request reports the virtual machine ID, set value, controlled IOPS, volume ID and address to the management server (S201). This processing is achieved by accessing the I/O control table.

The control check program proceeds to estimate the appropriate IOPS of each page and control the tiering based on the estimated IOPS (S202). At the time, the I/O Count Change Program of the storage system is notified with the controlled IOPS of the I/O control along with the volume ID, address which is used by the virtual machine and set value of the storage I/O control functionality. The I/O count change program which receives the notification detects the pages corresponding to the volume ID and address from the control check program (S203). This processing is achieved by using the volume table.

Then, the I/O count change program estimates the appropriate page IOPS based on the current IOPS of the page and ratio of notified controlled IOPS and set value (S204). For example, the program calculates the ratio of the notified set value and the controlled IOPS. And, the program calculates the current value of page IOPS×calculated ratio and replace the page IOPS with calculated value. This is an example and another calculation can be used. The I/O count change program updates the IOPS in the page table (S205). Finally, the I/O count change program terminates the processing (S206). After the flow at S202, the control check program directs the cancellation of the storage I/O control for the VM (S207). The cancel program which receives the cancellation instruction changes the control flag to OFF in the I/O control table (S208). Finally, the control check program terminates the processing (S209).

Figure 12B:
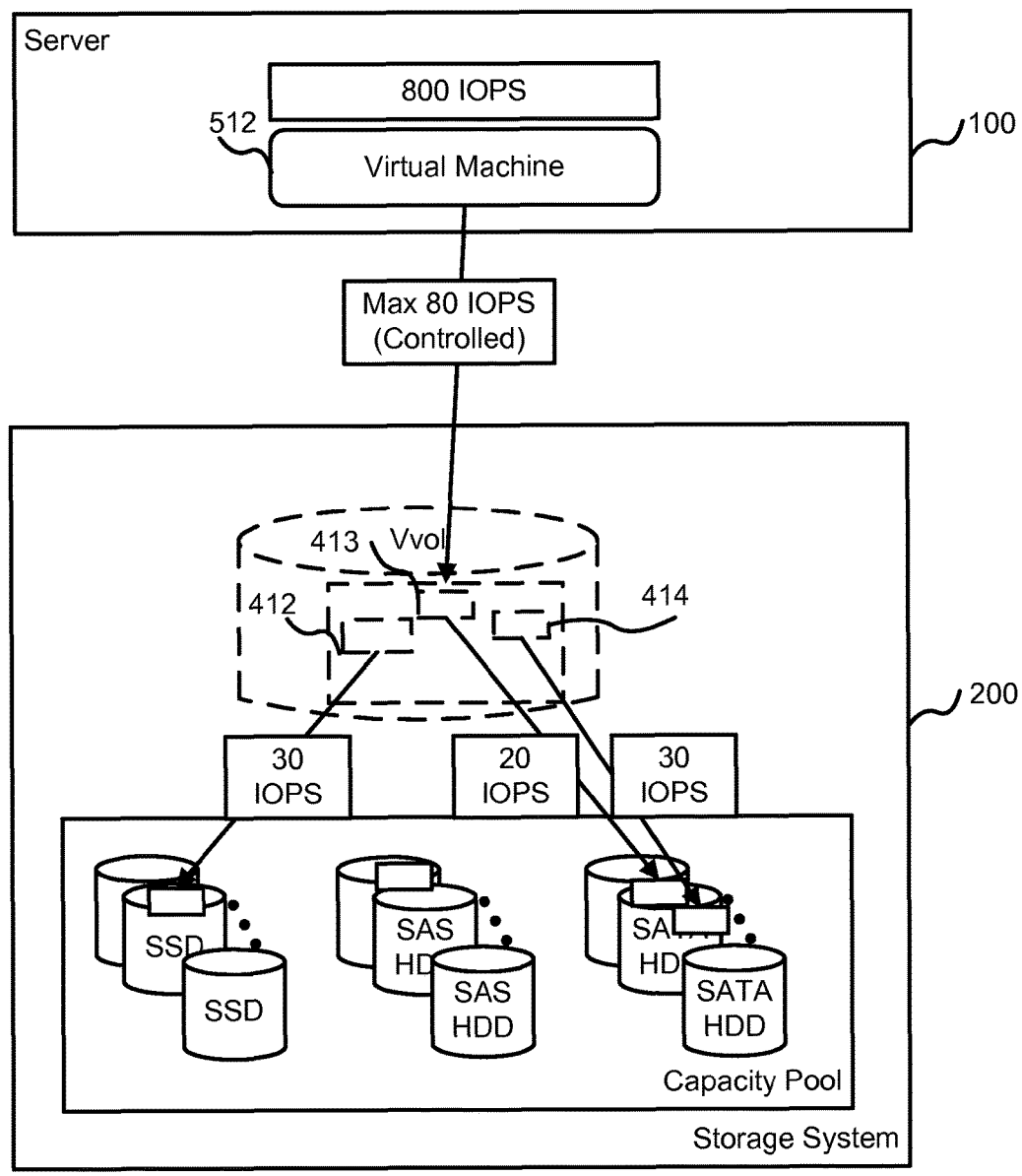
FIG. 12(b) illustrates an example estimation of the appropriate page IOPS based on the current IOPS of the page and the notified IOPS, in accordance with the first example implementation.

FIG. 12(b) illustrates an example estimation of the appropriate page IOPS based on the current IOPS of the page and the notified set value and controlled IOPS, in accordance with the first example implementation. In the example of FIG. 12(b), virtual machine 512 conducts I/O to pages 412, 413 and 414. Page 412 is currently accessed at a rate of 30 IOPS, page 413 is currently accessed at a rate of 20 IOPS, and page 414 is currently accessed at a rate of 30 IOPS. From the flow of FIG. 12(a), the storage system is notified of the set value and controlled IOPS of the virtual machine 512. In this example, the set value is 800 IOPS and the controlled IOPS is 80 IOPS. From the notified IOPS, the storage system estimates the page IOPS by proportionally allocating access rates to the pages associated with the virtual machine 512 based on the current IOPS and the notified IOPS. In this example, the ratio of the current IOPS to each page and the controlled IOPS (80 IOPS) is considered. The controlled IOPS is also calculated as the summation of IOPS of pages 412, 413 and 414. The ratio for page 412 is 30 IOPS/80 total IOPS, and 20 IOPS/80 total IOPS for page 413, and 30 IOPS/80 total IOPS for page 414. Thus, the estimated access rate of page 412 is 800 IOPS*30 IOPS/80 IOPS, or 300 IOPS. Similarly, the estimated access rate for page 413 is 200 IOPS, and 300 IOPS for page 414.

In the first example implementation, although the examples described are directed to the use of virtual machines, physical machines can also be used. The storage IO control functionality is achieved by communication between physical servers or the management server connected to physical servers.

Second Example Implementation

In a second example implementation, the methods to address possible problems caused by the storage tiering and de-duplication are described below. The hardware configuration for the second example implementation can be the same as the first example implementation as described above. Furthermore, diagrams, tables and programs as illustrated in the first example implementation can also be utilized for the second example implementation, depending on the desired implementation.

Figure 13:
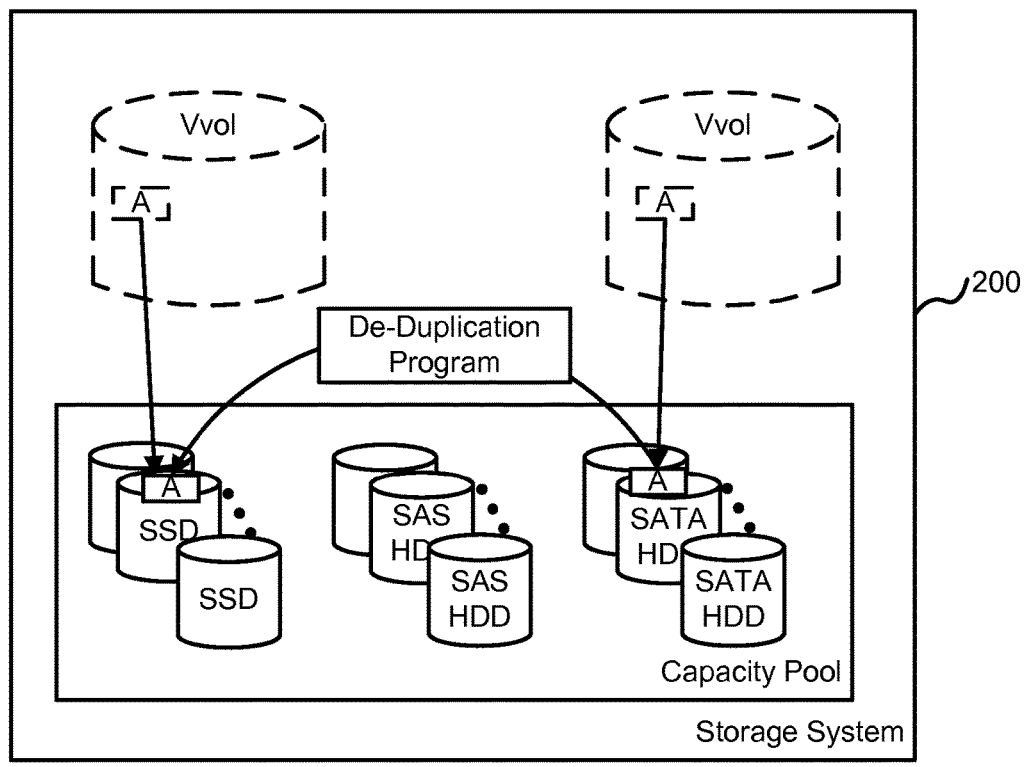
FIG. 13 is a diagram illustrating an example of the problem caused by the storage tiering and the de-duplication.

FIG. 13 is a diagram illustrating an example of the problem caused by the storage tiering and the de-duplication.

The storage system 200 has the de-duplication functionality. When the de-duplication functionality is executed in the tiered storage system, the data stored in different storage mediums may be de-duplicated. The example in FIG. 13 illustrates that the data on the SSD and another data on the SATA is de-duplicated. There are two cases; one where the data on SATA is deleted and replaced with the pointer pointing to the data on the SSD, and another where the data on SSD is deleted and replaced with the pointer pointing to the SATA. Generally, the first case is applied, but the second case may be utilized for various reasons. For example, when the data cached on the cache memory (DRAM) is destaged, the storage system executes the detection of the existence of the same data and conducts de-duplication. The transfer to the physical storage device is eliminated and the efficiency of the bandwidth in the storage system can be improved.

When the data on the SATA is deleted, the access to the SATA is moved to the SSD. So, the access to the data that was originally stored in the SSD may be blocked by the access to the data originally stored in the SATA. When the data on the SATA is not deleted, the access to the SSD is moved to the SATA. Thus the application which was accessing the data via the SSD may experience a performance decrease.

The second example implementation can address the aforementioned possibility. In the second example implementation, when the workload of the certain application can block the other workload on the SSD, the pinning option of the storage tiering functionality is used. Thus, the second example implementation does not perform the de-duplication for the pinned data.

Figure 14:
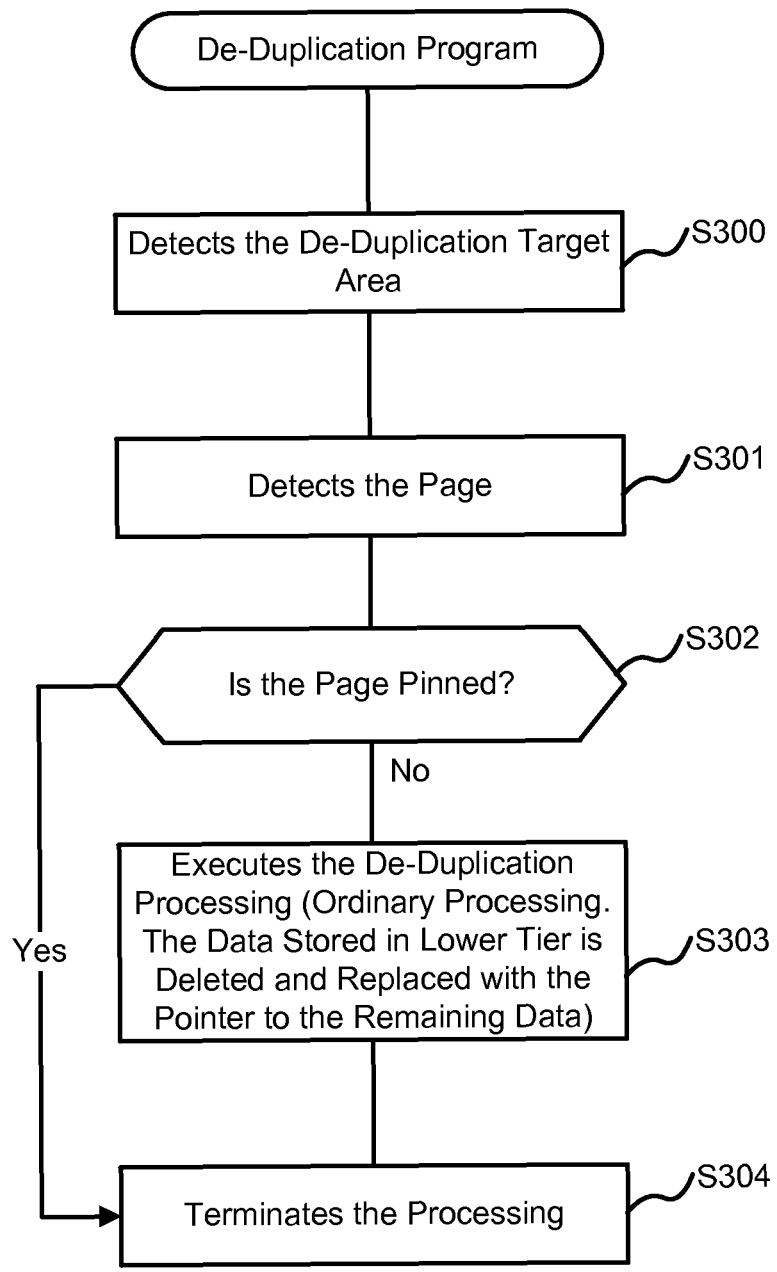
FIG. 14 is an example of a de-duplication program that avoids performing the de-duplication for the pinned data, in accordance with a second example implementation.

FIG. 14 is an example of a de-duplication program that avoids performing the de-duplication for the pinned data, in accordance with a second example implementation. The de-duplication program is executed in the storage system.

First, the de-duplication program detects the de-duplication target area (S300). Then, the program detects the page containing the detected area (S301). The program checks whether the page is pinned or not (S302). If the page is pinned (Yes), the program skips the de-duplication step and terminates the processing (S304). If the page is not pinned (No), the program progresses to S303 and performs the de-duplication processing. This processing can be implemented by de-duplication processing as known to one of ordinary skill in the art. Thus, one instance of the duplicated data is replaced with a pointer to the data that was not deleted. After S303, the program terminates the processing (S304).

The method for the case in which the data on the SSD is deleted is described below. When the data on the high performance storage medium becomes a deletion target, the execution of the de-duplication is determined by the type of the storage media which stores another instance of the data. For example, when the same data is stored in the SSD and SAS, the data on SSD can be deleted. But, when the same data is stored in the SSD and SATA, the data on SSD should not be deleted. Therefore, the de-duplication processing is not executed. This method manages the storage medium type storing the data which can be de-duplicated with target data.

FIG. 15 is an example of the de-duplication domain table, in accordance with a second example implementation. The first row in this example ("SSD") indicates that when the data on the SSD is de-duplicated by deleting the data on the SSD, the data which is kept must be stored in the SSD or SAS. The SSD data is not de-duplicated when the remaining instance of the data is stored on the SATA or external storage. The second row in this example ("SAS") indicates that when the data on the SAS is de-duplicated by deleting the data on the SAS, the data which is kept must be on SSD, SAS or SATA. The SAS data is not de-duplicated when the remaining instance of the data is stored on the external storage.

Figure 16:
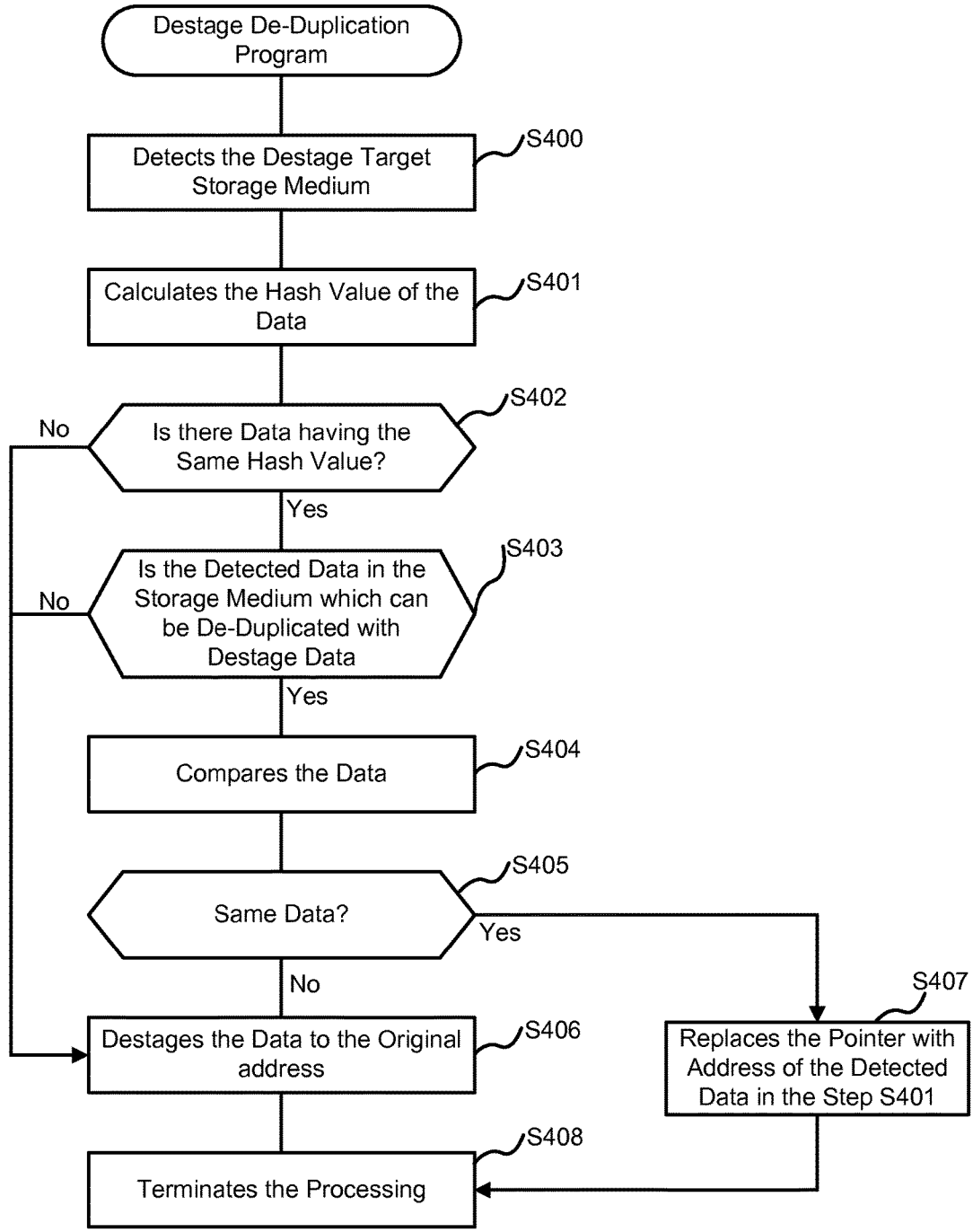
FIG. 16 is an example of the destage de-duplication program which uses the de-duplication domain table and checks whether the data can be de-duplicated or not, in accordance with a second example implementation.

FIG. 16 is an example of the destage de-duplication program which uses the de-duplication domain table and checks whether the data can be de-duplicated or not, in accordance with a second example implementation. First, the destage de-duplication program detects the destage target storage medium (S400). Then, the program calculates the hash value of the data (S401) and checks whether there is the data having the same hash value (S402). If the result is "No", the program progresses to S406 to destage the data to the original address. If the result is "Yes", the program checks whether the storage medium storing the detected data can be de-duplicated with destage data (S403).

If the result is "No", the program progresses to S406. Therefore, the de-duplication step is skipped. If the result is "Yes", the program compares the data (S404). If the content of the data is the same (S405), the program replaces the pointer with address of the detected data in S401 (S407), and terminates the processing (S408).

If the result is "No", the program progresses to S406. At S406, the program destages the data to the original address (S406) and terminates the processing (S408).

Figure 17:
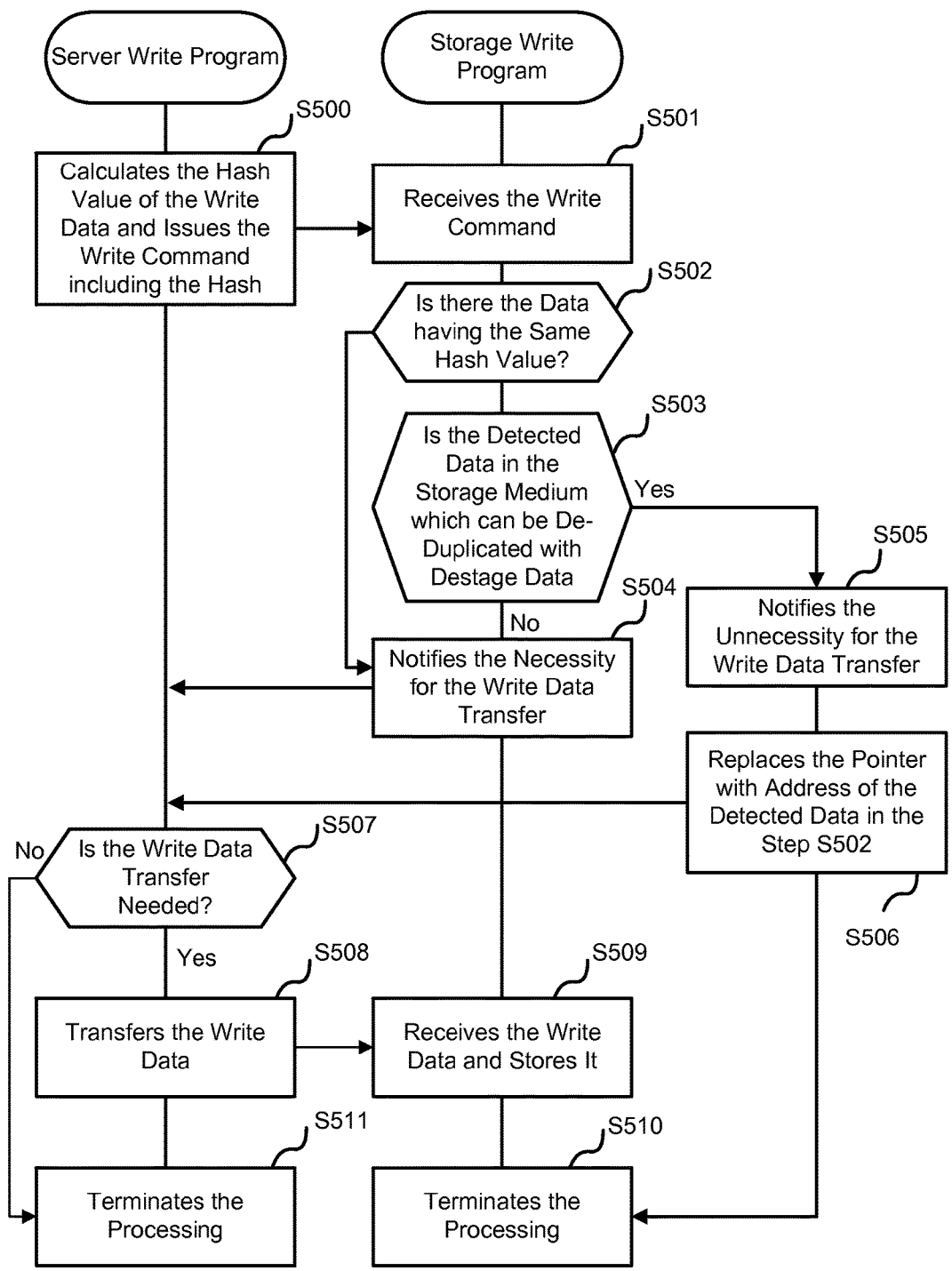
FIG. 17 illustrates an example of the server write program and storage write program, in accordance with a second example implementation.

The case where the data is destaged to the storage medium from the cache memory is described in FIG. 17. This method is applied also when the data is written to the storage from the server.

FIG. 17 is an example of the server write program and storage write program, in accordance with a second example implementation.

First, the server write program calculates the hash value of the write data and issues the write command including the hash value (S500). The storage write program which receives the write command (S501) checks whether there is data with the same hash value (S502). If the result is "No", the program progresses to step S504 and notifies the server write program with regards to the necessity for the write data transfer (S504). If the result is "Yes", the program checks whether the storage medium storing the detected data can be de-duplicated with write data (S503).

If the result is "No", the program progresses to S504 to indicate to the server of the necessity of the write data transfer. If the result is "Yes", the program progresses to S505. Then, the program notifies the server write program of the unnecessity for the write data transfer and replaces the pointer with address of the detected data at S506. The program progresses to S510 and terminates the processing.

The server write program which receives the response from the storage write program checks whether the write data transfer is needed (S507). If the result is "No", the program progresses to S511. If the result is "Yes", the program transfers the write data to the storage system (S508) and progresses to S511. At S511, the program terminates the processing. The storage write program which receives the write data from the server stores the write data in the original area (S509) and progresses to S510 and terminates the processing.

Some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In example implementations, the steps carried out require physical manipulations of tangible quantities for achieving a tangible result.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A system coupled to a server comprising:
   a storage system comprising:
   a plurality of storage devices including a first storage device and a second storage device having a higher performance than the first storage device; and
   a controller configured to manage a virtual volume having a plurality of virtual storage areas to which a first storage area in the first storage device or a second storage area in the second storage device is allocated according to access frequency information to each of the plurality of virtual storage areas;
   a management server comprising:
   a processor configured to receive a notification regarding access frequency restriction executed on the server, the access frequency restriction indicative of an access rate permitted by the server; and direct cancellation of the access frequency restriction executed on the server if the server is configured to use the virtual volume;
   wherein a virtual machine of the server is configured to control an access frequency between the server and the storage system through the access frequency restriction executed on the server; wherein the access frequency restriction executed on the server is based on information indicative of access frequency control between the server and the storage system by the server as being enabled or disabled;
   wherein the controller is configured to estimate the access frequency by using the access frequency for the each of the plurality of virtual storage areas and a ratio of a first access frequency value of the server before the access frequency restriction and a second access frequency value of the server after the access frequency restriction.

2. The system of claim 1, wherein if the controller in the storage system receives information regarding access frequency restriction to the server when the server is configured to use the virtual volume, from the management server, the controller in the storage system is configured to:
   estimate access frequency based on the access frequency information and the information regarding access frequency restriction to a virtual machine, and
   allocate either the first storage area in the first storage device or the second storage area in the second storage device to a virtual storage area from the plurality of virtual storage areas based on the estimated access frequency to the virtual storage area.

3. The system of claim 1,
wherein a plurality of virtual machines run on the server, and the access frequency restriction is executed on a first virtual machine from the plurality of virtual machines on the server,
wherein the management server directs the cancellation of the access frequency restriction executed on the first virtual machine if a second virtual machine from the plurality of virtual machines has a lower priority for access frequency than the first virtual machine and is not configured to execute access frequency restriction.

4. The system of claim 1, wherein the controller is configured to allocate the second storage area in the second storage device to a virtual storage area from the plurality of virtual storage areas when an estimated access frequency to the virtual storage area is greater than an access frequency to another virtual storage area to which the second storage area is allocated.

5. A method for a system coupled to a server, the method comprising:
for a storage system having a plurality of storage devices including a first storage device and a second storage device having a higher performance than the first storage device, managing a virtual volume having a plurality of virtual storage areas to which a first storage area in the first storage device or a second storage area in the second storage device is allocated according to access frequency information to each of the plurality of virtual storage areas; and
receiving, at a management server, a notification regarding access frequency restriction executed on the server, the access frequency restriction indicative of an access rate permitted by the server; and direct cancellation of the access frequency restriction executed on the server if the server is configured to use the virtual volume;
wherein a virtual machine of the server is configured to control an access frequency between the server and the storage system through the access frequency restriction executed on the server; wherein the access frequency restriction executed on the server is based on information indicative of access frequency control between the server and the storage system by the server as being enabled or disabled; and
estimating the access frequency by using the access frequency for the each of the plurality of virtual storage areas and a ratio of a first access frequency value of the server before the access frequency restriction and a second access frequency value of the server after the access frequency restriction.

6. The method of claim 5, further comprising:
if the storage system receives information regarding access frequency restriction to the server when the server is configured to use the virtual volume, from the management server, estimating access frequency based on the access frequency information and the information regarding access frequency restriction to a virtual machine, and allocating either the first storage area in the first storage device or the second storage area in the second storage device to a virtual storage area from the plurality of virtual storage areas based on the estimated access frequency to the virtual storage area.

7. The method of claim 5, wherein a plurality of virtual machines run on the server, and the access frequency restriction is executed on a first virtual machine from the plurality of virtual machines on the server, and wherein the method further comprises:
directing, at the management server, the cancellation of the access frequency restriction executed on the first virtual machine if a second virtual machine from the plurality of virtual machines has a lower priority for access frequency than the first virtual machine and is not configured to execute access frequency restriction.

8. The method of claim 5, further comprising allocating the second storage area in the second storage device to a virtual storage area from the plurality of virtual storage areas when an estimated access frequency to the virtual storage area is greater than an access frequency to another virtual storage area to which the second storage area is allocated.

9. A non-transitory computer readable medium, storing instructions for a system coupled to a server, the instructions comprising:
for a storage system having a plurality of storage devices including a first storage device and a second storage device having a higher performance than the first storage device, managing a virtual volume having a plurality of virtual storage areas to which a first storage area in the first storage device or a second storage area in the second storage device is allocated according to access frequency information to each of the plurality of virtual storage areas; and
receiving, at a management server, a notification regarding access frequency restriction executed on the server the access frequency restriction indicative of an access rate permitted by the server; and direct cancellation of the access frequency restriction executed on the server if the server is configured to use the virtual volume;
wherein a virtual machine of the server is configured to control an access frequency between the server and the storage system through the access frequency restriction executed on the server; wherein the access frequency restriction executed on the server is based on information indicative of access frequency control between the server and the storage system by the server as being enabled or disabled; and
estimating the access frequency by using the access frequency for the each of the plurality of virtual storage areas and a ratio of a first access frequency value of the server before the access frequency restriction and a second access frequency value of the server after the access frequency restriction.

10. The system of claim 1, wherein the ratio of a first access frequency value of the server before the access frequency restriction and a second access frequency value of the server after the access frequency restriction is the ratio of a current Input/Output per second (IOPS) to a controlled IOPS.

* * * * *